UNITED STATES PATENT OFFICE.

CURTIS C. MEIGS, OF PHILADELPHIA, PENNSYLVANIA, ASSIGNOR TO ELECTRO-CHEMICAL SUPPLY & ENGINEERING COMPANY, OF PHILADELPHIA, PENNSYLVANIA, A CORPORATION OF PENNSYLVANIA.

ACID AND WATERPROOF CEMENT AND METHOD OF MAKING THE SAME.

1,237,078.      Specification of Letters Patent.      Patented Aug. 14, 1917.

No Drawing.      Application filed November 6, 1916. Serial No. 129,750.

*To all whom it may concern:*

Be it known that I, CURTIS C. MEIGS, a citizen of the United States, residing in Philadelphia, Pennsylvania, have invented certain Improvements in Acid and Waterproof Cement and Methods of Making the Same, of which the following is a specification.

My invention consists of an acid and water proof cement composed of silica, apatite, and sodium silicate so treated that the cement, when set, will be acid proof and insoluble in water.

I first mix together the silicious material, such as crystalline silica, ground quartz, or the like, the apatite or pure calcium phosphate, and the sodium silicate, all of them being, by preference, in a dry state. When the cement is to be used the dry mixture is moistened in the usual way and quickly becomes set. In most cases the mixture should be made in proportions of about ninety parts of silicious material, ten parts of apatite, and thirty parts of sodium silicate.

Either before or after it becomes set the mixture is subjected to the action of an acid which will react upon the other components of the cement to render the same water proof. The acid which I prefer to use is sulfuric acid, which reacts upon the calcium phosphate to produce phosphoric acid, insoluble calcium sulfate and primary calcium phosphate, the further reaction of the sodium silicate producing insoluble tertiary calcium and sodium phosphates and silica, the final result being a hard, dense body which is impenetrable, insoluble and inert in the presence of water, without losing any of its acid-proof qualities.

The acid may, if desired, be applied in the form of a coating to bodies of the silica-calcium phosphate-sodium silicate mixture after they have been molded or pressed into form.

I claim:

1. The mode herein described of producing a water and acid proof cement, said mode consisting in first mixing together silicious material and apatite, and then adding sodium silicate to said mixture.

2. The mode herein described of producing a water and acid proof cement, said mode consisting in first mixing together silicious material and apatite, then adding sodium silicate to said mixture, and then subjecting the compound to the action of an acid which will react with said apatite and sodium silicate to render the compound waterproof.

3. The mode herein described of producing a water and acid proof cement, said mode consisting in first mixing together silicious material and apatite, then adding sodium silicate to the mixture, and then subjecting the compound to the action of sulfuric acid.

4. A water and acid proof cement, composed of silicious material, insoluble calcium sulfate, insoluble tertiary calcium and sodium phosphates, and silica.

In testimony whereof, I have signed my name to this specification.

CURTIS C. MEIGS.